United States Patent Office 3,745,165
Patented July 10, 1973

3,745,165
SUBSTITUTED ISOCHROMAN OR PHTHALAN PIPERIDENES
William J. Houlihan, Mountain Lakes, and Jeffrey Nadelson, Parsippany, N.J., assignors to Sandoz-Wander, Inc., Hanover, N.J.
No Drawing. Original application Oct. 5, 1970, Ser. No. 78,268, now Patent No. 3,686,186. Divided and this application May 22, 1972, Ser. No. 255,388
Int. Cl. C07d 29/30
U.S. Cl. 260—293.77   1 Claim

ABSTRACT OF THE DISCLOSURE

Substituted isochroman or phthalan piperidenes, e.g., 1'-benzylspiro[isochroman - 3,4' - piperiden]-1-one, prepared by refluxing the corresponding 2-[substituted-4-hydroxy-4-piperidyl]-substituted benzylamide. The compounds are useful as analgesic agents.

---

This is a division of application Ser. No. 78,268, filed Oct. 5, 1970, now U.S. Pat. No. 3,686,186.

This invention relates to isochroman or phthalan piperidenes. More particularly, it relates to substituted isochroman or phthalan piperidenes, acid addition salts thereof, intermediates thereof and processes for their preparation.

The compounds of this invention may be represented by the following structural formula:

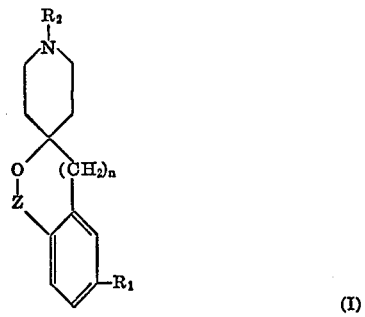

wherein $R_1$ is hydrogen, halogen having an atomic weight of 19 to 36, lower alkyl having 1 to 4 carbon atoms, e.g., methyl, ethyl, propyl, isopropyl, butyl or isobutyl, lower alkoxy having 1 to 4 carbon atoms, e.g., methoxy, ethoxy, propoxy, isopropoxy, butoxy, or isobutoxy, or trifluoromethyl,
$R_2$ is hydrogen or benzyl,
Z is —CH$_2$— or

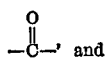

and $n$ is 0 or 1.

The compounds of this invention may also be represented by the following structural formulas:

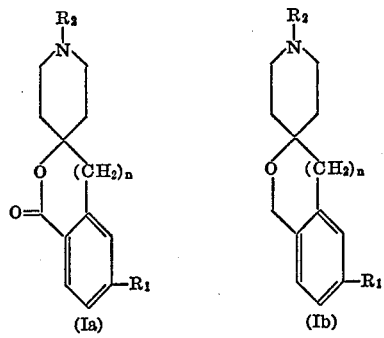

wherein $R_1$, $R_2$ and $n$ have the above-stated significance.

The compounds of Formula Ia where $R_2$ is benzyl (Ia$_1$) may be prepared by the following reaction scheme A:

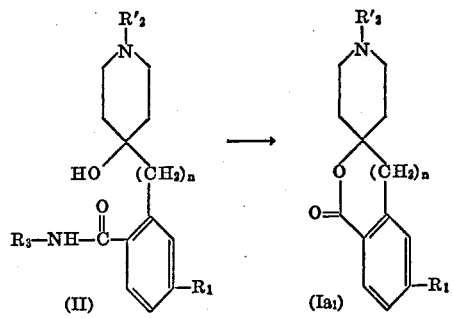

wherein $R_1$ and $n$ have the above-stated significance,
$R_2'$ is benzyl, and
$R_3$ is lower alkyl having 1 to 4 carbon atoms, e.g., methyl, ethyl, propyl, isopropyl, butyl or isobutyl.

The compounds of Formula Ia$_1$ are prepared by treating a compound of Formula II in an inert solvent such as benzene, toluene, xylene, o-dichlorobenzene at a temperature of from 60° C. to the reflux temperature of the solvent, preferably from 100 to 200° C. for 12 to 48 hours, preferably 24 hours. Neither the solvents nor the temperatures used are critical.

The compounds of Formula Ib where $R_2$ is benzyl (Ib$_1$) may be prepared by the following reaction scheme B:

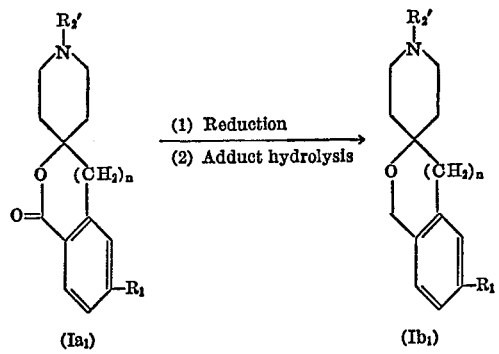

wherein $R_1$, $R_2'$ and $n$ have the above-stated significance.

The compounds of Formula Ib$_1$ are prepared by first reducing in the presence of an inert gas, e.g., nitrogen, a compound of Formula Ia$_1$ with a reducing agent such as sodium borohydride (NaBH$_4$) or boronfluoride etherate [BF$_3$·(C$_2$H$_5$)$_2$O] in an inert ether solvent such as tetrahydrofuran, diethyleneglycoldimethylether and the like, at a temperature of from 0° to 100° C., preferably 40° to 60° C. for about 1 to 3 hours. The resulting adduct is hydrolyzed in an inert solvent such as tetrahydrofuran, dioxane and the like, with a strong acid such as glacial acetic acid, conc. hydrochloric acid and the like at a temperature of from 50° to 150° C., preferably 90° to 110° C. for 1 to 3 hours. Neither the solvents nor the temperatures used are critical.

The compounds of Formula Ia where $R_2$ is hydrogen ($R_2''$) (Ia$_2$) may be prepared from the compounds of (Ia$_1$) by conventional methods, e.g., treating a compound of Formula Ia$_1$ with ethylchloroformate (III) in an inert solvent such as benzene, toluene and the like at a temperature of from 80° to 180° C., preferably 120° C. for about 12-48 hours, preferably about 20 hours to form the intermediate compound of the formula

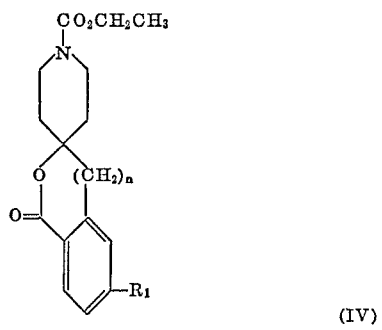

(IV)

wherein $R_1$ and $n$ have the above-stated significance, then treating intermediate Compound IV with a strong hydroxide base, such as potassium hydroxide in a lower alcohol solvent such as ethanol or propanol at a temperature of from 60° to 160° C., preferably 80° C. for 12-48 hours, preferably about 20 hours.

The compounds of Formula Ib where $R_2$ is hydrogen ($R_2''$) (Ib$_2$) may be prepared from the compounds of (Ib$_1$) by conventional methods, e.g., by treating a compound of Formula Ib$_1$ with Compound III under the reaction conditions described above for the preparation of Compounds Ia$_2$ to form the intermediate compound of the formula

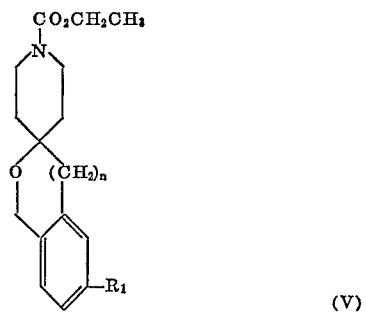

(V)

wherein $R_1$ and $n$ have the above-stated significance, then treating intermediate Compound V with a strong hydroxide base and under the reaction conditions described for the treatment of Compound IV above.

The compounds of Formula II may be prepared by the following reaction scheme C:

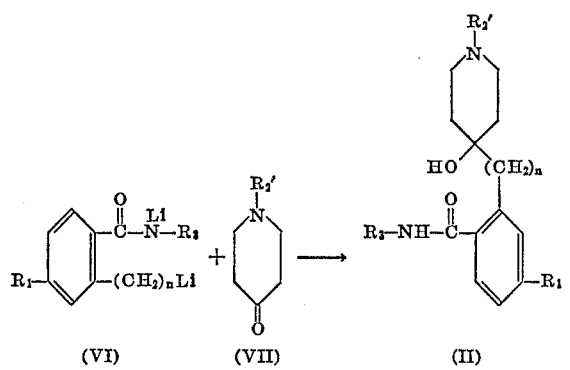

wherein $R_1$, $R'_2$, $R_3$ and $n$ have the above-stated significance.

The compounds of Formula II are prepared by treating a compound of Formula VI with a compound of Formula VII in an inert solvent such as hexane, tetrahydrofuran, ether, benzene and the like at a temperature of from —80° to —40° C. for 1 to 3 hours. Neither the solvents used nor the temperatures are critical.

The compounds of Formula Ib where $R_2$ is hydrogen ($R_2''$) (Ib$_2$) may be prepared from the compounds of Formula Ia where $R_2$ is hydrogen ($R_2''$) (Ia$_2$) under the reaction conditions and using the reducing agents and solvents of reaction scheme B.

Certain of the compounds of Formulas VI and VII are known and may be prepared according to methods disclosed in the literature. Those compounds of Formulas VI and VII not specifically disclosed are prepared according to analogous methods from known materials.

The compounds of Formula I may be prepared in acid addition salt form, such as the hydrochloride, by conventional methods, such as suspending the compound in alcohol or water and treating with the appropriate acid. When it is desired to convert such salts of the corresponding free bases, conventional techniques may be utilized, e.g., dissolution of the salt in water and precipitation using a base such as sodium hydroxide.

The compounds of Formula I may be recovered using conventional recovery techniques such as crystallization.

The compounds of Formula I are useful because they possess pharmacological activity in animals, such as mammals. In particular, the compounds of Formula Ia are useful as hypotriglyceridemics as indicated by tests on a group of male albino Wistar rats which are given typically 60 mg./kg. of the active compound daily, for 3 days, followed by extraction with isopropanol of serum after anesthetizing the rats with sodium hexabarbital, and then noting the glycerol content as compared to that of a control group. The glycerol content is determined by the method of Lofland (Anal. Biochem. 9, 393, 1964).

The compounds of Formula Ia where $n=0$, and the compounds of Formula Ib, are useful as anti-hypertensives as indicated by their activity in the anesthetized dog given 20 mg./kg. i.v. of active material, and tested by blood pressure measurements using a mercury manometer or transducer via a catheter inserted in a carotid or femoral artery.

The compounds of Formula Ib are useful as anti-depressants as indicated by their activity in the mouse given 15 to 26 mg./kg. intraperitoneally of the active compound and tested for its ability to reverse reserpine hypothermia (Spencer, P.S.J., "Antagonism of Hypothermia in the Mouse by Anti-depressants, in Anti-depressant Drug," pp. 194-204, eds., S. Garattine and M. N. G. Dukes, Excerpta Medica Foundation, 1967).

When so utilized, the compounds may be combined with one or more pharmaceutically acceptable carriers or adjuvants. Depending upon the particular active compound employed, the exact dosage utilized may vary.

Furthermore, the compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general satisfactory results are obtained when the compounds are administered for the hypotriglyceridemic use at a daily dosage of from about 5.0-300 mg./kg. of animal body weight, preferably given in divided doses, 2 to 4 times a day or in sustained release form. For most larger mammals (e.g., primates) the total daily dosage is from about 350 milligrams to about 3000 milligrams. Dosage forms suitable for internal use comprise from about 87 milligrams to about 1500 milligrams of the active compound in intimate admixture with a solid or liquid pharmaceutically acceptable carrier or diluent.

Satisfactory results are obtained when the compounds are administered for the anti-hypertensive use at a daily dosage of from about 3.0-300 mg/kg. of animal body weight, preferably given in divided doses, 2 to 4 times a day or in sustained release form. For most larger mammals (e.g., primates) the total daily dosage is from about 200 milligrams to about 2000 milligrams. Dosage forms suitable for internal use comprise from about 50 milligrams to about 1000 milligrams of the active compound in intimate admixture with a solid or liquid pharmaceutically acceptable carrier or diluent.

Satisfactory results are obtained when the compounds are administered for the anti-depressant use at a daily dosage of from about 1.0 to 100 mg./kg. of animal body weight, preferably given in divided doses, 2 to 4 times a day or in sustained release form. For most larger mammals (e.g., primates) the total daily dosage is from about 75 milligrams to about 1000 milligrams. Dosage forms suitable for internal use comprise from about 18 milligrams to about 500 milligrams of the active compound in intimate admixture with a solid or liquid pharmaceutically acceptable carrier or diluent.

A representative formulation suitable for oral administration is a capsule prepared by standard techniques which contains the following:

| Ingredients: | Parts by weight |
|---|---|
| 1'-benzylspiro[phthalan-1-4'-piperiden]-3-one | 25 |
| Inert filler (starch, kaolin, lactose, etc.) | 275 |

EXAMPLE 1

Spiro[phthalan-1,4'-piperidine]hydrochloride

Step (a): 2[1-benzyl-4-hydroxy-4-piperidyl]-N-methylbenzamide.—To a flask equipped with a stirrer, dropping funnel, condenser and gas inlet tube maintained under a nitrogen atmosphere there was added at room temperature 1.35 (0.01 mole) N-methyl benzamide and 30 ml. anhydrous tetrahydrofuran. The reaction flask was immersed in an ice bath and cooled to an internal temperature of 5°. Stirring was initiated and 14 ml. of 15% n-butyl lithium (0.022 mole) in hexane was added dropwise in ca 30 minutes, keeping the temperature below 8°. The resutling intermediate red dilithio salt was stirred at 5° for one hour and then the reaction flask was immersed in a Dry Ice-acetone bath and cooled to an internal temperature of —60°. To the cold reaction mixture a solution of 1.89 g. (0.01 mole) N-benzyl piperidine in 20 ml. anhydrous tetrahydrofuran was added dropwise in ca 20 minutes, keeping the temperature between —60° and —40°. The resulting mixture was stirred at —50° for 1 hour and then allowed to warm to 0° during 1 hour and then 25 ml. of saturated ammonium chloride solution was added dropwise keeping the temperature below 10°. The two phases were separated and the organic was washed with 20 ml. saturated ammonium chloride, dried over magnesium sulfate and evaporated in vacuo. The resulting 0.1 was triturated with ether, filtered, and crystallized from ethylacetate to give the intermediate compound 2[1-benzyl - 4-hydroxy-4-piperidyl]-N-methylbenzamide, M.P. 146°–148° C.

Step (b): 1' - benzylspiro[phthalan-1,4'-piperiden]-3-one.—To a flask equipped with a condenser and a calcium chloride drying tube was added 19.4 g. (0.06 mole) 2[1-benzyl-4-hydroxy-4-piperidyl]-N-methyl benzamide (from Step a), 200 ml. glacial acetic acid and 4 ml. conc. $H_2SO_4$. The reaction mixture was then refluxed for 2.5 hours, then cooled to room temperature and the acetic acid removed in vacuo, and 50 ml. water was added to the residue. This was then cooled in an ice bath and made strongly basic (pH>10) by the slow addition of solid potassium hydroxide. The basic solution was extracted with 2×100 ml. of methylene chloride, the methylene chloride washed with 1×50 ml. $H_2O$, dried over anhydrous magnesium sulfate and evaporated in vacuo. The resulting oil was dissolved in ether, and then crystallized with methanol to give the product 1'-benzylspiro[phthalan-1,4'-piperiden]-3-one, M.P. 105°–106° C.

Step (c): 1' - benzylspiro[phthalan-1,4'-piperidene].—To a flask equipped with a stirrer, dropping funnel and condensed and maintained under a nitrogen atmosphere add 3.75 g. (0.1 mole) sodium borohydride ($NaBH_4$) and 250 ml. diethyleneglycoldimethylether and (diglyme) cool to an internal temperature of 5°. To this add a solution, prepared by adding 212.5 g. (1.5 mole) of $BF_3 \cdot Et_2O$ to 14.7 g. (0.05 mole) of 1'-benzylspiro[phthalan-1,4'-piperidene]-3-one (from Step b) in 250 ml. diglyme, dropwise with stirring maintaining the temperature below 5°.

After the addition is complete the reaction mixture is heated at 50° for one hour, then cooled to 0° and 100 ml. water added dropwise keeping temperature below 5°. The excess solvents are removed by distillation in vacuo and the residue treated with $CH_2Cl_2$ and filtered and the $CH_2Cl_2$ washed with 2×100 ml. water, dried over anhydrous magnesium sulfate and evaporated. The residue is dissolved in 350 ml. tetrahydrofuran containing 120 ml. glacial acetic acid and heated at reflux for 1 hour. The excess solvents are distilled in vacuo and the residue dissolved in $CH_2Cl_2$, washed with 2×100 ml. 2 N NaOH, the $CH_2Cl_2$ dried over anhydrous magnesium sulfate and evaporated to give a solid, recrystallized from hot ether to give the product, 1'-benzylspiro[phthalan-1,4'-piperidene], M.P. 68.5° to 70.5° C.

Step (d): 1'-ethoxycarbonylspiro[phthalan-1,4'-piperidene].—A solution of 20.5 g. (0.073 mole) 1'-benzylspiro[phthalan-1,4'-piperidene] (from Step b), 34.7 ml. (0.365 mole) ethyl chloroformate and 200 ml. toluene was heated at reflux, under nitrogen for 20 hours. The excess solvents were removed by distillation in vacuo leaving pure 1'-ethoxycarbonylspiro[phthalan-1,4'-piperidene] as an oil.

Step (e): spiro[phthalan-1,4'-piperidene]hydrochloride.—A solution of 15 g. 1'-ethoxycarbonylspiro[phthalan-1,4'-piperidene] (from Step d), 17.4 g. potassium hydroxide (0.31 mole) and 75 ml. ethanol was heated at reflux, under nitrogen for 20 hours. The mixture was cooled and filtered and the filtrate evaporated in vacuo. The residue was dissolved in $CH_2Cl_2$ and washed with 3×50 ml. water, dried over anhydrous magnesium sulfate and evaporated. The residue was dissolved in diethyl ether and treated with gaseous HCl at 0°. The resulting solid was filtered and recrystallized from ethanol-ether to give the product, spiro[phthalan-1,4'-piperidene]hydrochloride, M.P. 208.5–209.5° C.

EXAMPLE II

Spiro[phthalan-1,4'-piperiden]-3-one

Step (a): 1'-ethoxycarbonylspiro[phthalan-1,4'-piperiden]-3-one.—A solution of 5.86 g. (0.02 mole) of 1'-benzylspiro[phthalan-1,4'-piperiden]-3-one (from Example I, Step (b)), 9.5 ml. (0.1 mole) of ethyl chloroformate and 60 ml. of toluene was heated at reflux, under nitrogen for 20 hours. The excess solvents were removed by distillation in vacuo and the residue was triturated with diethyl ether and then recrystallized from hot ethyl acetate to give 1'-ethoxycarbonylspiro[phthalan-1,4'-piperidene]-3-one, M.P. 151°–152° C.

Step (b): spiro[phthalan-1,4'-piperiden]-3-one.—A solution of 21.5 g. (0.078 mole) of 1'-ethoxycarbonylspiro[phthalan-1,4-piperiden]-3-one (from Step (a)), 23.5 g. (0.42 mole) of potassium hydroxide and 105 ml. of ethanol were heated at reflux, under nitrogen, for 18 hours. The mixture was cooled and filtered and the filtrate was treated with gaseous HCl and evaporated in vacuo. The residue was dissolved in toluene, treated with 10 ml. conc. HCl and heated at reflux, under nitrogen, with water removal for 10 hours. The toluene was removed in vacuo, the residue dissolved in $CH_2Cl_2$, washed with 2×50 ml. 2 N sodium hydroxide and 2×50 ml. water, dried over anhydrous magnesium stearate and evaporated. The residue was recrystallized from hot ethyl acetate to give the product spiro[phthalan - 1,4 - piperiden]-3-one, M.P. 130.5°–131.5° C.

EXAMPLE III

Step (a).—By using the conditions of Example I, Step (a), and in place of N-methylbenzamide, and starting with (1) p-chloro-N-methylbenzamide, (2) p-toluamide, (3)

p-anisamide, or (4) α,α,α-trifluoro-p-toluamide, the following intermediate products are obtained, (1) 2[1-benzyl-4-hydroxy-4-piperidyl]-4-chloro-N-methylbenzamide
(2) 2[1-benzyl-4-hydroxy-4-piperidyl]-N-methyl-p-toluamide
(3) 2[1-benzyl-4-hydroxy-4-piperidyl]-N-methyl-p-anisamide, or
(4) 2[1-benzyl-4-hydroxy-4-piperidyl]-α,α,α-trifluoro-N-methyl-p-toluamide.

Step (b).—By using the conditions of Example I, Step (a), and in place of 2-[1-benzyl-4-hydroxy-4-piperidyl]-N-methylbenzamide, and starting with the appropriate intermediate product of Step a of this example, the following products are obtained, (1) 6-chlorospiro[phthalan-1,4′-piperiden]-3-one
(2) 6-methylspiro[phthalan-1,4′-piperiden]-3-one
(3) 6-methoxyspiro[phthalan-1,4′-piperiden]-3-one, or
(4) 6-trifluorospiro[phthalan-1,4′-piperiden]-3-one.

Step (c).—By using the conditions of Example I, Step (c), and in place of 1′-benzylspiro[phthalan-1,4′-piperidene]-3-one, and starting with the appropriate product compound of Step (b) of this example, the following products are obtained, (1) 6-chlorospiro[phthalan-1,4′-piperidene]
(2) 6-methylspiro[phthalan-1,4′-piperidene]
(3) 6-methoxyspiro[phthalan-1,4′-piperidene], or
(4) 6-trifluorospiro[phthalan-1,4′-piperidene].

Step (d).—By using the conditions of Example I, Step (d), and in place of 1′-benzylspiro[phthalan-1,4′-piperidene], and starting with the appropriate product of Step (b) of this example, the following compounds are obtained, (1) 1′-ethoxycarbonyl-6-chlorospiro[phthalan-1,4′-piperidene]
(2) 1′-ethoxycarbonyl-6-methylspiro[phthalan-1,4′-piperidene]
(3) 1′-ethoxycarbonyl-6-methoxyspiro[phthalan-1,4′-piperidene] or
(4) 1′-ethoxycarbonyl-6-trifluorospiro[phthalan-1,4′-piperidene].

Step (e).—By using the conditions of Example I, Step (e), and in place of 1′-ethoxycarbonylspiro[phthalan-1,4′-piperidene], starting with the appropriate compound of Step (d) of this example, the following products are obtained, (1) 6-chlorospiro[phthalan-1,4′-piperidene]
(2) 6-methylspiro[phthalan-1,4′-piperidene]
(3) 6-methoxyspiro[phthalan-1,4′-piperidene] or
(4) 6-trifluorospiro[phthalan-1,4′-piperidene].

EXAMPLE IV

Step (a).—By using the conditions of Example II, Step (a), and in place of 1′-benzylspiro[phthalan-1,4′-piperidene]-3-one, and starting with the appropriate product of Example III, Step (b), the following compounds are otained, (1) 1′-ethoxycarbonyl-6-chlorospiro[phthalen-1,4′-piperiden]-3-one
(2) 1′-ethoxycarbonyl-6-methylspiro[phthalen-1,4′-piperiden]-3-one
(3) 1′-ethoxycarbonyl-6-methoxyspiro[phthalan-1,4′-piperiden]-3-one or
(4) 1′-ethoxycarbonyl-6-trifluorospiro[phthalan-1,4′-piperiden]-3-one.

Step (b).—By using the conditions of Example II, Step (b), and in place of 1′-ethoxycarbonylspiro[phthalan-1,4′-piperiden]-3-one, and starting with the appropriate compound of Step (a) of this example, the following products are obtained, (1) 6-chlorospiro[phthalan-1,4′-piperiden]-3-one
(2) 6-methylspiro[phthalan-1,4′-piperiden]-3-one
(3) 6-methoxyspiro[phthalan-1,4′-piperiden]-3-one or
(4) 6-trifluoromethylspiro[phthalan-1,4′-piperiden]-3-one.

EXAMPLE V

Step (a).—By using the conditions of Example I, Step (a), and in place of N-methylbenzamide, and starting with (1) 4-chloro-o-toluamide
(2) 2,4-xylylamide
(3) 2-methyl-p-anisamide, or
(4) p-trifluoromethyl-o-toluamide
(5) o-toluamide the following intermediate products are obtained, (1) 2[1-benzyl-4-hydroxy-4-piperidylmethyl]-4-chloro-N-methylbenzamide
(2) 2[1-benzyl-4-hydroxy-4-piperidylmethyl]-N-methyl-p-toluamide
(3) 2[1-benzyl-4-hydroxy-4-piperidylmethyl]-N-methyl-p-anisamide
(4) 2[1-benzyl-4-hydroxy-4-piperidylmethyl]-α,α,α-trifluoro-N-methyl-p-toluamide, or
(5) 2[1-benzyl-4-hydroxy-4-piperidylmethyl]-N-methylbenzamide, M.P. 160–161° C.

Step (b).—By using the conditions of Example I, Step (a), and in place of 2-[1-benzyl-4-hydroxy-4-piperidyl]-N-methylbenzamide, and starting with the appropriate intermediate product of Step (a) of this example, the following products are obtained, (1) 6-chlorospiro[isochroman-3,4′-piperiden]-1-one
(2) 6-methylspiro[isochroman-3,4′-piperiden]-1-one
(3) 6-methoxyspiro[isochroman-3,4′-piperiden]-1-one
(4) 6-trifluorospiro[isochroman-3,4′-piperiden]-1-one, or
(5) spiro[isochroman-3,4′-piperiden]-1-one, M.P. 278–283° C. dec.

Step (c).—By using the conditions of Example I, Step (c), and in place of 1′-benzylspiro[phthalan-1,4′-piperidene] - 3-one, and starting with the appropriate intermediate compound of Step (b) of this example, the following products are obtained, (1) 6-chlorospiro[isochroman-3,4′-piperidene]
(2) 6-methylspiro[isochroman-3,4′-piperiden]
(3) 6-methoxyspiro[isochroman-3,4′-piperidene]
(4) 6-trifluorospiro[isochroman-3,4′-piperidene], or
(5) spiro[isochroman-3,4′-piperidene]

Step (d).—By using the conditions of Example I, Step (d), and in place of 1′-benzylspiro[phthalan-1,4′-piperidene], and starting with the appropriate product of Step (b) of this example, the following compounds are obtained, (1) 1′-ethoxycarbonyl-6-chlorospiro[isochroman-3,4′-piperidene]
(2) 1′-ethoxycarbonyl-6-methylspiro[isochroman-3,4′-piperidene]
(3) 1′-ethoxycarbonyl-6-methoxyspiro[isochroman-3,4′-piperidene]
(4) 1′-ethoxycarbonyl-6-trifluorospiro[isochroman-3,4′-piperidene], or
(5) 1′-ethoxycarbonylspiro[isochroman-3,4′-piperidene]

Step (e).—By using the conditions of Example I, Step (e), and in place of 1′-ethoxycarbonylspiro[phthalan-1,4′-piperidene], starting with the appropriate compound of Step (d) of this example, the following products are obtained, (1) 6-chlorospiro[isochroman-3,4′-piperidene]
(2) 6-methylspiro[isochroman-3,4′-piperidene]
(3) 6-methoxyspiro[isochroman-3,4′-piperidene]
(4) 6-trifluorospiro[isochroman-3,4′-piperidene], or
(5) spiro[isochroman-3,4′-piperidene]

EXAMPLE VI

Step (a).—By using the conditions of Example II, Step (a), and in place of 1'-benzylspiro[phthalan-1,4'-piperidene]-3-one, and starting with the appropriate product of Example V, Step (b), the following compounds are obtained, (1) 1'-ethoxycarbonyl-6-chlorospiro[isochroman-3,4'-piperiden]-1-one
(2) 1'-ethoxycarbonyl-6-methylspiro[isochroman-3,4'-piperiden]-1-one
(3) 1'-ethoxycarbonyl-6-methoxyspiro[isochroman-3,4'-piperiden]-1-one
(4) 1'-ethoxycarbonyl-6-trifluorospiro[isochroman-3,4'-piperiden]-1-one, or
(5) 1'-ethoxycarbonylspiro[isochroman-3,4'-piperiden]-1-one Step (b).—By using the conditions of Example II, Step (b), and in place of 1'-ethoxycarbonylspiro[phthalan-1,4'-piperiden]-3-one, and starting with the appropriate compound of Step (a) of this example, the following products are obtained, (1) 6-chlorospiro[isochroman-3,4'-piperiden]-1-one
(2) 6-methylspiro[isochroman-3,4'-piperiden]-1-one
(3) 6-methoxyspiro[isochroman-3,4'-piperiden]-1-one
(4) 6-trifluoromethylspiro[isochroman-3,4'-piperiden]-1-one, or
(5) spiro[isochroman-3,4'-piperiden]-1-one

What is claimed is:
1. A compound of the formula

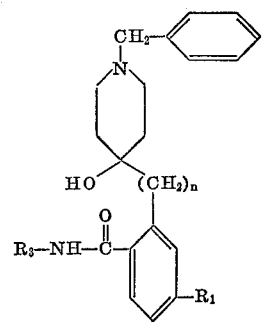

wherein:
$R_1$ is hydrogen, halogen having an atomic weight of 19 to 36, lower alkyl, lower alkoxy or trifluoromethyl;
$R_3$ is lower alkyl; and
$n$ is 0 or 1.

References Cited
UNITED STATES PATENTS 3,600,395   8/1971   Regnier et al. _____ 260—293.4

HENRY R. JILES, Primary Examiner

G. T. TODD, Assistant Examiner

U.S. Cl. X.R.

260—293.58